United States Patent Office.

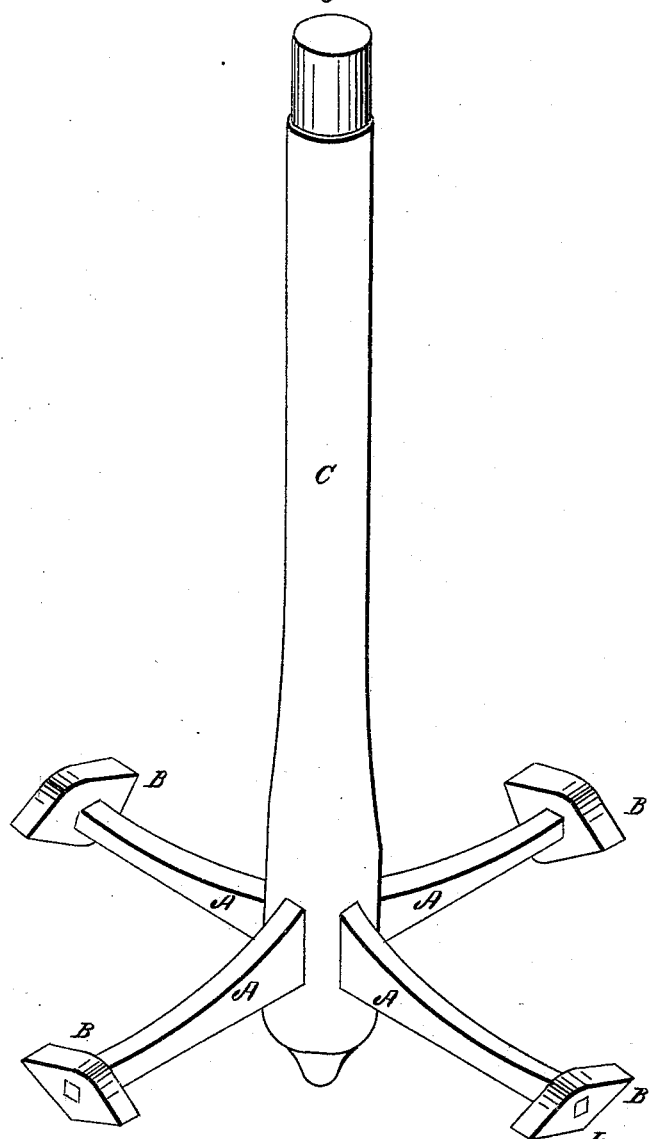

IMPROVEMENT IN CHURN DASHERS.

JAMES T. RITTENHOUSE, OF URBANA, ILLINOIS.

Letters Patent No. 59,781, dated November 20, 1866.

SPECIFICATION.

TO ALL WHOM IT MAY CONCERN:

Be it known that I, JAMES T. RITTENHOUSE, of the city of Urbana, in the county of Champaign, and State of Illinois, have invented a new and useful improvement on the Rotary Churn Dasher, and I do hereby declare that the following is a full, clear, and exact description of the construction and operation of the same, reference being had to the annexed drawings making a part of the specification, in which fig. 1 is a perspective view. The constructive part of my invention is as follows: I insert into a shaft marked C, as represented in fig. 1, four arms at right angles with each other, made tapering on the upper sides thereof from the point of insertion outwards, as shown by letters A A. Upon the ends of these arms I place diamond-shaped wedges B B. The dasher thus constructed is intended to be operated as follows: A square box, of proper size to allow the dasher to turn in easily, is used for the churn, in the bottom of which, a hole being bored for that purpose, the shaft of the dasher is placed, and is turned by running-gear attached to the upper side of the covering of the churn, and by turning the dasher the diamond-shaped wedges B B plough through the cream, and, in conjunction with the arms A A, force it up and outwards against the sides of the box, thus allowing a free circulation of the air into the cream around the shaft while it is being freely agitated.

What I claim as my invention, and desire to secure by Letters Patent, is—

Embraced in the combination of the arms A A, made tapering, as above set forth, with the diamond-shaped wedges B B, attached to the ends thereof, for the purpose of agitating the cream in such a manner—forcing it upwards and outwards—as to admit of a free circulation of air while thus agitated. No claim whatever is made to that part of the dasher designated as the shaft, except in so far as it is necessary to secure by the use of it the combination above mentioned.

JAMES T. RITTENHOUSE.

Witnesses:
W. H. SOMERS,
JAMES MUNHALL.